(12) United States Patent
Fourez (10) Patent No.: US 10,204,333 B2
(45) Date of Patent: Feb. 12, 2019

(54) LOCATION CONTROLS ON PAYMENT CARD TRANSACTIONS

(71) Applicant: MasterCard International Incorporated, Purchase, NY (US)

(72) Inventor: Pablo Fourez, Waterloo (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 104 days.

(21) Appl. No.: 14/634,210

(22) Filed: Feb. 27, 2015

(65) Prior Publication Data

US 2015/0170135 A1   Jun. 18, 2015

Related U.S. Application Data

(63) Continuation of application No. 12/544,009, filed on Aug. 19, 2009.

(51) Int. Cl.
*G06Q 40/00* (2012.01)
*G06Q 20/32* (2012.01)
(Continued)

(52) U.S. Cl.
CPC ....... *G06Q 20/3224* (2013.01); *G06Q 20/202* (2013.01); *G06Q 20/32* (2013.01);
(Continued)

(58) Field of Classification Search
CPC ........... G06Q 20/3224; G06Q 20/4016; G06Q 40/02; G06Q 20/40; G06Q 20/20; G06Q 20/32; G06Q 20/405; G06Q 20/327; G06Q 30/0261; H04W 64/00; H04W 12/12; H04W 4/021; H04W 4/14; H04W 4/023;
(Continued)

(56) References Cited

U.S. PATENT DOCUMENTS 4,874,932 A   10/1989   Kimizu
5,883,810 A   3/1999   Franklin et al.
(Continued)

FOREIGN PATENT DOCUMENTS

EP   0 745 961 A2   12/1996
EP   0 813 173 A2   12/1997
(Continued)

OTHER PUBLICATIONS

"News: Ericsson IPX Fighting CC Fraud", Extra Credit Cards, May 7, 2009, 1 page, http://www.extracreditcards.com/news/2009may/ericssonipx.htm.
(Continued)

*Primary Examiner* — Samica L Norman
(74) *Attorney, Agent, or Firm* — Buchanan Ingersoll & Rooney PC (57) ABSTRACT

Geographical location information provided by a mobile device is used as a control on the use of a payment card as described. Mobile device identification is linked to a payment card account such that when a payment card authorization request is received, information about the geographic location of the origination of the request is checked against the geographic location provided by the mobile device, and if there is a match, the transaction can further processed for authorization or directly authorized.

21 Claims, 2 Drawing Sheets

(51) Int. Cl.
*G06Q 20/40* (2012.01)
*G06Q 20/42* (2012.01)
*G06Q 20/20* (2012.01)

(52) U.S. Cl.
CPC ........... *G06Q 20/327* (2013.01); *G06Q 20/40* (2013.01); *G06Q 20/4014* (2013.01); *G06Q 20/425* (2013.01)

(58) Field of Classification Search
CPC ............ G08B 13/1427; G08B 21/0213; H04L 12/585; H04L 2463/102; H04L 51/12; H04L 67/18; H04L 63/0263; H04L 63/107; G06F 2221/2111; G06F 17/3087; G06F 17/30041; H04M 15/8033
USPC ...................................................... 705/35, 44
See application file for complete search history.

(56) References Cited

U.S. PATENT DOCUMENTS

| | | | |
|---|---|---|---|
| 5,903,830 | A | 5/1999 | Joao et al. |
| 5,963,925 | A | 10/1999 | Kolling et al. |
| 6,913,194 | B2 | 7/2005 | Suzuki |
| 7,487,170 | B2 | 2/2009 | Stevens |
| 7,664,702 | B2 | 2/2010 | Jung et al. |
| 7,832,636 | B2 | 11/2010 | Heffez et al. |
| 7,909,240 | B2 | 3/2011 | Nelson |
| 2002/0020741 | A1 | 2/2002 | Sakaguchi |
| 2002/0099649 | A1 | 7/2002 | Lee et al. |
| 2002/0108062 | A1 | 8/2002 | Nakajima et al. |
| 2002/0160771 | A1 | 10/2002 | Massie et al. |
| 2003/0028481 | A1 | 2/2003 | Flitcroft et al. |
| 2004/0254868 | A1* | 12/2004 | Kirkland ............... H04W 4/023 705/35 |
| 2005/0066179 | A1 | 3/2005 | Seidlein |
| 2005/0119017 | A1 | 6/2005 | Lovell et al. |
| 2006/0237531 | A1 | 10/2006 | Heffez et al. |
| 2007/0055672 | A1* | 3/2007 | Stevens ............... G06F 17/3087 |
| 2007/0084913 | A1* | 4/2007 | Weston .................. G06Q 20/20 235/380 |
| 2008/0248813 | A1* | 10/2008 | Chatterjee .................. 455/456.2 |
| 2009/0012898 | A1 | 1/2009 | Sharma et al. |
| 2009/0327135 | A1* | 12/2009 | Nguyen ................. G06Q 20/40 705/44 |
| 2010/0279656 | A1 | 11/2010 | Hazzani |

FOREIGN PATENT DOCUMENTS

| | | |
|---|---|---|
| EP | 0848360 A1 | 6/1998 |
| EP | 1 265 200 A1 | 12/2002 |
| EP | 1 286 285 | 2/2003 |
| IE | 83058 | 10/2003 |
| JP | 2003-150883 A | 5/2003 |
| KR | 10-2005-0121538 A | 12/2002 |
| KR | 20040021425 A | 3/2004 |
| KR | 20040078954 A | 9/2004 |
| WO | WO 00/49586 A1 | 8/2000 |
| WO | WO 00/63855 A1 | 10/2000 |
| WO | WO 02/29739 | 4/2002 |
| WO | WO 02/29739 A2 | 4/2002 |
| WO | WO 02/052879 | 7/2002 |
| WO | WO 03/063037 | 7/2003 |
| WO | WO 03/067506 | 8/2003 |
| WO | WO 2009/148387 A1 | 12/2009 |

OTHER PUBLICATIONS

Jeremy Kirk, "Ericsson Offers Phone Location Service to Counter Credit Card Fraud", Computerworld Mobile & Wireless, May 26, 2009, 2 pages, http://www.computerworld.com/action/article.do?command=viewArticleBasic&articleId=p.
Jason Kincaid, "Mastercard's ATM Hunter Is the Latest Must-Have for Your iPhone Utility Belt", TechCrunch, Apr. 14, 2009, 1 page, htt://www.techcrunch.com/2009/04/14/mastercards-atm-hunder-is-the-must-have-for-your-iphone-utilitybelt.
"Mastercard Corporate Fleet Card", Mastercard Worldwide, 2 pages, http:www.mastercard.com/us/business/en/corporate/fleet/payments/fleet_card.html.
New Mobile Phone Technology From Secure Identity Systems Stops Card Fraud Cold, Money & Finance, Business Wire, Posted Mar. 5, 2008, 2 pages, http://www.secureidentitysystems.com/news/articles/08_3march/03_07_08_AOLMoneyandFinance.pdf, AOL.
Confirm Fraud Management Solutions, Fraud Management Solutions for Credit Card Issuers, 1 page, http://www.mconfirm.com/index.html.
European Search Report dated Nov. 4, 2010, issued in the corresponding European Patent Application No. 10173343.4-1238.
International Search Report dated Apr. 12, 2011 in the corresponding PCT International Patent Application No. PCT/US2010/002277.
Written Opinion dated Apr. 12, 2011 in the corresponding PCT International Patent Application No. PCT/US2010/002277.
European Office Action dated Dec. 4, 2014 in corresponding EP Application No. 10173343.4 filed on Aug. 19, 2010 (5 pages).
Singapore Examination Report dated Mar. 16, 2018, issued in corresponding Singapore Application No. SG10201405002V (4 pages).

* cited by examiner

Figure 2

LOCATION CONTROLS ON PAYMENT CARD TRANSACTIONS

FIELD

The present system and method relate to controlling payment card transactions based on a mobile device being substantially co-located with the location where a payment card transaction is initiated, and the ability for selective controls to be placed on the payment card by the cardholder or issuing bank.

BACKGROUND

One of the more constant problems within the payment card industry is the management of fraud in the use of payment cards. In fact, a significant portion of card fraud is counterfeit fraud, which involves counterfeit payment cards being used fraudulently at ATMs and/or points of sale (POS), often in a foreign country relative to the card holder's home country. To address this problem, card payment providers sometimes deny transactions from countries where such fraud is common unless the cardholder alerts the payment card issuer of his travels to that country. This can be inconvenient to the cardholder. For instance, when a cardholder travels to Russia where counterfeit fraud is currently a problem, it may be that his or her transactions are denied unless he or she informs or had informed the card issuer of his or her travels.

Another mechanism being proposed is to use mobile phone locator services such as Ericsson's IPX (Internetwork Packet Exchange) Country Look-Up Service provided by cellular telephone service providers to provide a confirmation that a person is in the country where the transaction is carried out. However, this requires involving the cellular telephone provider, and likely incurring the costs for the service thereof, is limited to mobile phone services that offer such a service and is limited to mobile phones. Further, it may not be particularly useful if the mobile phone locator service only identifies a large geographic region, such as a country. This approach would also involve the complexity of coordinating entities which are not normally in communication, such as the cardholder, the cellular telephone service provider, and the payment card industry, particularly the card issuer.

In areas not directly related to the method and system disclosed herein, consumers currently have access to a range of personal devices (such as cellphones, GPS devices, personal computers, etc.), which are able to identify (to varying levels of accuracy) the geographic location (based on either of or a mix of GPS systems, mobile phone cell-phone towers, Wi-Fi hot-spot, IP address, etc.). In this respect, a number of software applications are available in the market which offer consumers with customized services based on the location information enabled on their mobile device. For example: (1) MasterCard has an iPhone application to locate the nearest ATM based on the geo-location information provided by the phone; (2) MasterCard already provides location based card controls based on the location of the payment transaction on the card (e.g. country or event, merchant or POS); (3) some providers have applications on mobile devices that enable users to search for products and services based on the location information (e.g. to find a restaurant); and (4) other services enable an application enable a network of "friends" or "family" to share location based information and, for example, to find friends in the vicinity of the mobile device or to be alerted when a friend arrive nearby (e.g. in the same city, for example).

There does not appear to be any existing services in the market which enable cardholders to apply controls on a payment card based on location based information obtained from a mobile device with geo-location capabilities. Further, there does not appear to be existing bank or issuing services in the market leveraging location based card controls for the purpose of preventing and managing fraud on payment cards.

SUMMARY OF THE INVENTION

As disclosed herein, the present method and system for providing location control on payment card use involves a mechanism by which, depending on particular embodiments, one or more of these problems may be avoided or mitigated, while, depending on the particular embodiments, providing additional opportunities for the customer or cardholder to impose their own location controls, as well as potentially other user-defined controls, on the use of their real payment number (RPN), or a pseudo card number or control payment number (CPN), as the case may be.

In certain exemplary embodiments, the location control payment controls can take the form of a financial transaction method and system that includes the steps and system configured to: (i) receive in a managing computer system comprising a memory device capable of storing data which associates identification information of individual mobile devices with individual payment card accounts, and a computer processor, a request from a merchant for authorization of a payment card transaction against a payment card account of a customer. The authorization request from the merchant indicates the geographic origin of the request for authorization. The method and system are configured to receive, in the managing computer system, information communicated by a mobile device regarding a current geographic location as determined by the mobile device and identity of the mobile device, wherein the mobile device has electronics capable of determining a geographic location of the mobile device. The method and system are configured to identify, in the managing computer system, at least one mobile device associated with the payment card account against which a request for authorization has been received by accessing data stored in the memory device. The method and system are configured to determine, in the managing computer system, whether the geographic origin of the authorization request matches the geographic location determined by the mobile device; and at least one of: (1) permit the payment card transaction to be processed for authorization when the geographic origin of the authorization request matches the geographic location determined by the mobile device, and (2) take action to permit denying the authorization request for the transaction to be processed for authorization when the geographic origin of the request does not match the geographic location of the mobile device.

Research indicates that cardholders want increased control over their payment cards. MasterCard has launched card based control capabilities and services for banks and cardholders. Providing location based card controls to consumers can add value to this effort. Additionally, as efforts continue to use mobile devices as contactless cards for payment card transactions, and for person-to-person payment mechanisms, the presently disclosed method and system will have greater value.

Enabling banks and card issuers to offer card control services based on cardholders' geo-location information provided by cardholder's mobile device would provide an ability to manage fraud via geo-location based card controls depending on the particulars of the embodiment. This service, for instance, could enable banks and card issuers to manage fraud limits, impose blocks or generate alerts based on location information. Thus, the method and system could greatly increase the accuracy of fraud detection and prevention in certain exemplary embodiments. For example, the method and system could enable issuers to decline a payment card transaction if the country of the merchant (as identified in the card transaction information) is different from the country where the consumer is reported to be (as identified by the information provided to the platform by the mobile device).

These and other features and advantages of particular embodiments of the location payment card transaction control method and system will now be described by way of exemplary embodiments to which they are not limited.

DETAILED DESCRIPTION

The method and system for location controls on the payment card transactions will now be described by reference to the accompanying drawings in which like elements are described with like figure numbers. It should be noted that the claimed invention is not limited to these particular embodiments but rather fully encompasses variations and modifications which may occur to those skilled in the art.

Depending on the embodiment, the card location controls disclosed herein can provide consumers with a service to manage location-based controls on their payment card or cards linked to a mobile device or devices that have geo-location capabilities.

In exemplary embodiments, cardholders 150 (and/or banks or card issuers 120) can be provided with access to a management platform, e.g., managing computer system 110, to set and manage card controls via a software application that consumers can install, or can be installed by the manufacture of provider of the mobile device 160, on one or multiple mobile devices with geo-location based capabilities. The management computer system 110 may also be accessed via an internet browser on a Mac or PC or nearly any Internet enabled mobile device.

An exemplary mobile device application would enable consumers to perform one or more of the following:

Register one or multiple mobile devices 160 into the card management computer system 110 and enable the mobile device 160 to transmit geo-location based information to managing computer system 110;

Link (i.e., associate) one or more mobile devices 160 to one or multiple payment cards; and Set location based controls on the payment cards, by way of non-limiting examples.

The application may further enable consumers 150 (and/or banks and/or card issuers 120) to perform one or more of the following:

Define personal or custom location areas or other location based criteria, such as but not limited to: home location (city and country), usual destinations (cities, countries, etc.), etc.;

Define personal or custom control profiles, such as (but not limited to): "at home", "at school", "traveling", etc. which include custom controls designed by the cardholder related to the geographic location information identified by the profile name; and Associate different "personal locations" to "personal control profiles" such that when the mobile device reports a current location identified in a "personal locations" data file, the associated "personal control profiles" can be automatically invoked, as some additional non-limiting examples.

Exemplary types of card location-based controls can in certain embodiments include the ability for consumers 150 (and/or banks or card issuers 120) to set one or more of the following:

Authorization locks (enable/disable card transactions based on location),

Authorization limits (maximum spend or maximum number of transactions based on location), and Transaction alerts (e.g., sent over TCP/IP networks, SMS, email, software alerts, etc.) based on location.

Exemplary System Architecture

Figure 1:
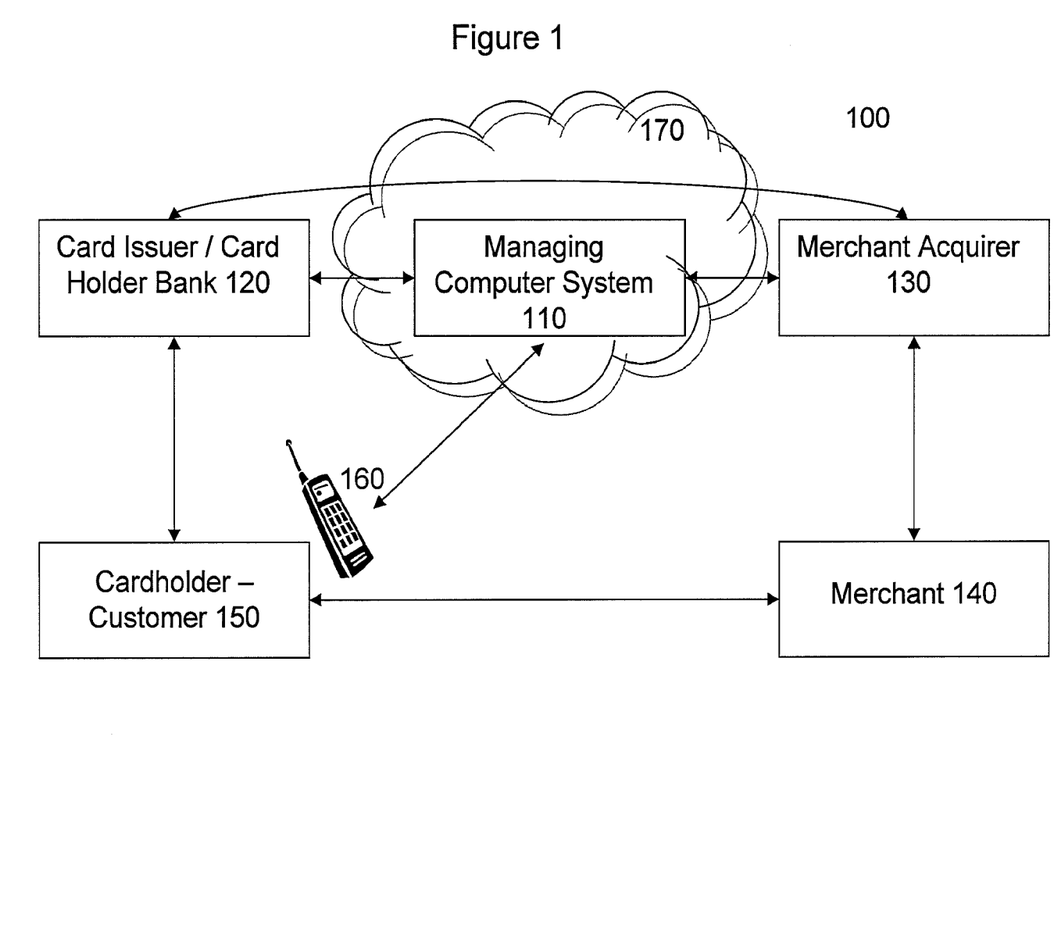
FIG. 1 illustrates a high level diagram of a system architecture that may be employed in accordance with an exemplary embodiment of the location controls on payment card transactions.

As illustrated in FIG. 1, in the financial transaction system 100, the managing computer system 110 includes a memory device, which may be any form of data storage device including but not limited to electronic, magnetic, optical recording mechanisms, combinations thereof or any other form of memory device capable of storing data which associates identification information of individual mobile device such as mobile device 160 associated with a customer 150 with individual payment card accounts issued by a card issuer 120 to a cardholder. It is noted that as used herein a customer 150 may be the cardholder or an authorized user of the payment card who is not the cardholder. The managing computer system 110 also includes a computer processor, which may be in the form of a stand-alone computer, a distributed computing system, a centralized computing system, a network server with communication modules and other processors, or nearly any other automated information processing system configured to receive requests from merchants 140, typically through a merchant acquirer 130 though not necessarily so depending on the card processing network, for authorization of payment card transactions against a payment card account of a customer 150.

The authorization request from the merchant 140 includes various data regarding the identity of the payment card account, the type and amount of the transaction, merchant data information, and additionally the geographic origin of the request for authorization. This geographic origin of the request for authorization may be generated by a merchant terminal (interface) at a fixed location for card-present transactions, or from information received during a transaction regarding the customer's IP (internet protocol) address, computer identification that indicates the location of the computer, such as the customer's home computer or business desk-top computer that the customer had previously identified as being associated or linked with the payment card account, or nearly any other form of information that would tend to identify the geographic origin of the request for authorization. It should be noted that the geographic origin can be determined by electronics in the mobile device 160, pre-stored, or entered by the customer or cardholder 150, but includes the actual geographic location of the interface device through which the transaction, and therefore the request for authorization, is originated by a customer or cardholder 150.

The managing computer system 110 also receives information communicated by a mobile device 160 regarding a current location of the mobile device 160 as determined by the mobile device 160. The mobile device 160 has electronics capable of determining a current geographic location of the mobile device 160. For instance, the mobile device 160 may include the ability to use the GPS (geographic positioning system), or to estimate its position by being in the range of a wireless (e.g. 802.11 or Wi-Fi) local area network transmitter, or triangulate its position by using the transmissions of Wi-Fi transmitters, the position of which is known or can be derived from either to the managing computer system 110, by the mobile device 160, or by the Wi-Fi transmitters which transmit their location information to the mobile device 160. Alternatively or additionally, the mobile device 160 may be able to determine its geographic location based on transmissions from cellular phone communication providers via cell towers (either by being in the coverage area of one or triangulating its position from three or more cellular transmitters) and the like which either transmits the location of the cellular communication transmitters so that the mobile device can determine its own location based thereon, or conveys to the mobile device 160 the location as determined by the cellular system as to the location of the mobile device 160. The mobile device 160 could be provided with an application to open a communication channel or channels to the managing computer software 110, and optionally that would permit the user to set controls on the payment card, including controls that are geographically based, as explained above (e.g., individual controls, controls based on customer profiles set by the cardholder/customer 150 or issuing bank 120, for instance. Of course, additionally or alternatively any internet based device or other communication path to the managing computer system 110 could be utilized by the customer 150 in setting these controls in the card use. The application could also enable or disable the transmission of the location of the mobile device 160. This application can be preloaded on the mobile device 160 by the manufacture or retailer of the mobile device 160, or downloaded and installed by the customer 150.

The managing computer system 110 also accesses data stored in its memory device to identify at least one mobile device 160 associated with the payment card account against which a request for authorization has been received from a merchant 140, and determines whether the geographic origin of the authorization request matches the geographic location conveyed by the mobile device 160.

As used herein, the geographic origin of the authorization may "match" the geographic location determined by the mobile device either by determining whether they are within a given distance of one to the other, and may be based on longitude and latitude information or street addresses or other relatively absolute or fixed physical locations. Alternatively or additionally, the geographic origin of the transaction request might match the geographic location of the mobile device if it is in the same local community as the geographic location of the mobile device. In this instance, the same local community may be a town, a city, and county or province, as examples. Alternatively or additionally, the geographic origin of the transaction authorization request may match the geographic location of the mobile device if it occurs in the same country, for example. Further, rules can be set up, based on transaction details (e.g., the amount, frequency of use, merchant, type of merchant, type of transaction (e.g., ATM, POS, etc.), country of origin of the transaction, etc.), the sophistication of the transaction equipment and/or communications equipment, the quality and the information being provided, etc., and combinations of these factors) to flexibly match the geographic location with the geographic origin at different levels of specificity depending on these factors. For instance, a micro payment of $10.00 or less, for example, might be approved based on the country in which the mobile device is located or was last reported to be located, whereas a more significant payment of $100.00 would only be approved if the geographic location matched within a radius of several hundred feet of the mobile device location (e.g., the smallest resolution of the location detection circuitry that was reported within a given time period, to provide a couple examples. As mentioned above, the customer 150 or the issuing bank 120 can set up profiles of these factors, the profiles being selected by the customer 150 or the issuing bank 120, or invoked by location profiles that are triggered when the mobile device 160 and/or the origin of the transaction is within a given geographic location, or combinations thereof.

The managing computer system 110 can permit the payment card transaction to be processed for authorization when the geographic origin of an authorization request matches (flexibly or inflexibly) the geographic location determined by the mobile device, or alternatively take action to permit denying the authorization request for the transaction to be processed for authorization when the geographic origin of the request does not match the geographic location of the mobile device. It should be noted that in certain embodiments permitting the payment card transaction to be processed might be in the form of taking no actual action but allowing the transaction to flow as normal. If customer convenience at the time of the transaction can be viewed as being more important than preventing fraud in that particular level of transaction for example. Thus, exemplary embodiments could be in place where the payment card transaction progresses if the geographic location and geographic origin are not matched because the information was not sufficiently or timely provided. In exemplary embodiments, the action to permit denying the authorization request may be in the form of simply denying the authorization request directly by sending a denial message to the merchant 140. Alternatively, the managing computer system 110 can send a notification to the payment card account issuer 120 that the authorization should be denied. In the latter instance, the payment card account issuer 120 may decide to authorize the transaction despite the indication that the geographic origin of the authorization request does not match the geographic location of the mobile device. This can be done, for example, by way of a set of rules that may be geared towards the type of payment, the type or history of the merchant and/or customer, the amount of the transaction, the country of origin, other factors as may be appropriate to reduce frustration among customers without incurring additional undue risk for fraudulent transactions, or other factors that may govern the setting of policies and rules by the payment card account issuer 120.

It will be appreciated that these communications regarding the payment card transaction can be made through legacy or a future iteration of the card payment network 170.

With respect to the mobile device 160, it should be noted that the mobile device 110 can be any form of mobile communication device having geo-location capabilities, including, but not limited to, wireless mobile devices such as a cellular telephones, wireless e-mail devices such as a Blackberry®, personal digital assistants, laptops with a wireless communication card, or nearly any other form of past or present or future mobile communication device that would be associated with and likely carried by a customer when making or initiating a payment card transaction. A customer 150 who owns or controls the mobile device 160 would be able to selectively enable or disable the mobile device 160 from providing a current geographic location to the managing computer system 110 if for no other reason than customer preference or privacy concerns.

The mobile device 160 can communicate the information regarding its current geographic location to the managing computer system 110 through any form of network or communication protocols including TCP/IP of the Internet or a private network through the Internet, SMS messages, over the cellular telephone system, e-mail messages over the Internet or a private network, and any form of point-to-point communication, whether encrypted or otherwise, as examples.

Further, the managing computer system 110 may take action to permit denying of the transaction by communicating through the card transaction or payment processing network 170 a denial message to the merchant requesting authorization and, optionally, sending an alert to at least one of the customers and/or the card account issuer. With respect to the customer 150, the denial-message is preferably through the mobile device 160, but not limited thereto. For instance, if the mobile device 160 is off or left behind, it may be more effective to communicate the denial through various communication means including telephone calls to various numbers associated with the customer 150, alternative mobile devices, e-mail accounts, software alerts or other communications as set up between the customer 150 and the card account issuer 120, and perhaps identified by the customer 150 by order of preference.

In this regard, information used to associate or link a payment card account with a mobile device 160 can include identifying multiple payment card accounts to be associated with one or more mobile devices. In fact, multiple mobile devices 160 may be associated with a given payment card account, and multiple payment card accounts may be associated with a given mobile device 160. In this way, a customer 150 who typically carries one of several mobile devices 160, or authorizes others who have their own mobile devices 160 (e.g., family members) would not be inconvenienced by having to remember or match which mobile device to a given payment card when carrying or initiating transactions using a particular payment card account.

Further, in exemplary embodiments, the managing computer system 110 can take action to permit or deny the transaction by sending an alert to the customer 150 such that the customer 150 may decide to indicate that the transaction is to be authorized or denied. The managing computer system 110 can optionally permit or deny the transaction due to not receiving the alert or not responding because the communication was not received or not detected by the customer. For example, system defaults can be set up by the payment card account issuer or by the customer or by both that can deny the transaction unless the customer authorizes the transaction within the given period of time, or that can authorize the transaction unless the customer indicates that the transaction is to be denied, each within the given period of time.

With respect to the financial transaction system 100, it should be noted that it further can include a card issuer 120. Here it should be understood that the card issuer 120 may issue a physical card, or only virtual cards. It should be further understood that the payment card may represent the "real" payment card or account number (RPN), or may alternatively be a virtual payment card, and may have additional controls set by a user, generally known as a controlled payment number (CPN). In yet another alternative, a virtual payment card account may be associated with the real payment number such that the virtual payment number is a stand-in or pseudo-card (whether also in physical form or only a virtual payment number) that have additional controls on use either set up by the payment card account issuer 120, or by the customer 150, or by both. These additional controls (as identified above as individual controls or as parts of personal or location-based profiles) limiting the use of the payment card numbers are in addition to the regular payment card authorization process.

As shown in FIG. 1, there can also a merchant acquirer 130, which is typically the merchant's bank. The merchant acquirer 130 receives transaction authorization requests, which are then forwarded on to the managing computer system 110 either directly or through at least one other party (e.g. the card issuer 120). It should be noted here that the managing computer system 110 can be part of the merchant acquirer 130, but because there are typically multiple merchant acquirers 130 that can receive transactions for a given payment card account in most circumstances, it would be preferable in most circumstances for the managing computer system 110 not to be part thereof. The managing computer system 110 can be part of the card issuer 120, or be an intermediary, as shown in FIG. 1.

The managing computer system 110 checks for a match between the reported geographic origin of the transaction authorization request and the reported geographic location of the mobile device 110, and potentially other controls as set by the customer when the card customer 150 or the card issuer 120. As explained above, the payment card transaction is forwarded to a card issuer 120 through a card network 170 for the normal approval process. Here, it should be noted that the managing computer system 110 can be part of the card issuer 120, which is typically the cardholder's bank, but it should also be noted that in some embodiments communications travel directly between the merchant acquirer 130 and the card issuer 120 through a card network 170 for approving and denying payment card transaction requests. In these embodiments, payment card transaction requests would also be routed to the managing computer system 110 either at the same time or routed through the card issuer 120, which can provide additional information to the card issuer 120 regarding whether the geographic origin of the transaction request and the geographic location of the mobile device 160 match. Alternatively, all communications can travel through the managing computer system 110 between the merchant acquirer 130 and the card issuer 120 or a hybrid of the two systems can be provided.

It should be noted that in certain systems, the merchant acquirer 130 and the card issuer 120 are actually the same computer facility and the legal entity such as American Express® and Discover® which act as both the cardholder's bank and the merchant's bank for these types of transactions. Further, card processors such as TSYS® can incorporate the managing computer system. Additionally, the managing computer system does not have to be separate or apart from other card processing facilities, but can be in the form of computer programs running on the same computers or computer systems. Furthermore, though shown in FIG. 1 and FIG. 2 as carrying out its function before the normal card processing steps for authorizations (e.g., account balance, available credit, fraud detection, etc.), the location controls can occur after these normal processes are completed or concurrently therewith, but normally before the authorization request is approved. In yet other embodiments, it can be used to confirm transactions as being potentially fraudulent or not by retrospectively checking the location of the customer's mobile device against the origin of the payment card transaction, as part of an investigation regarding potential fraudulent charges.

Figure 2:
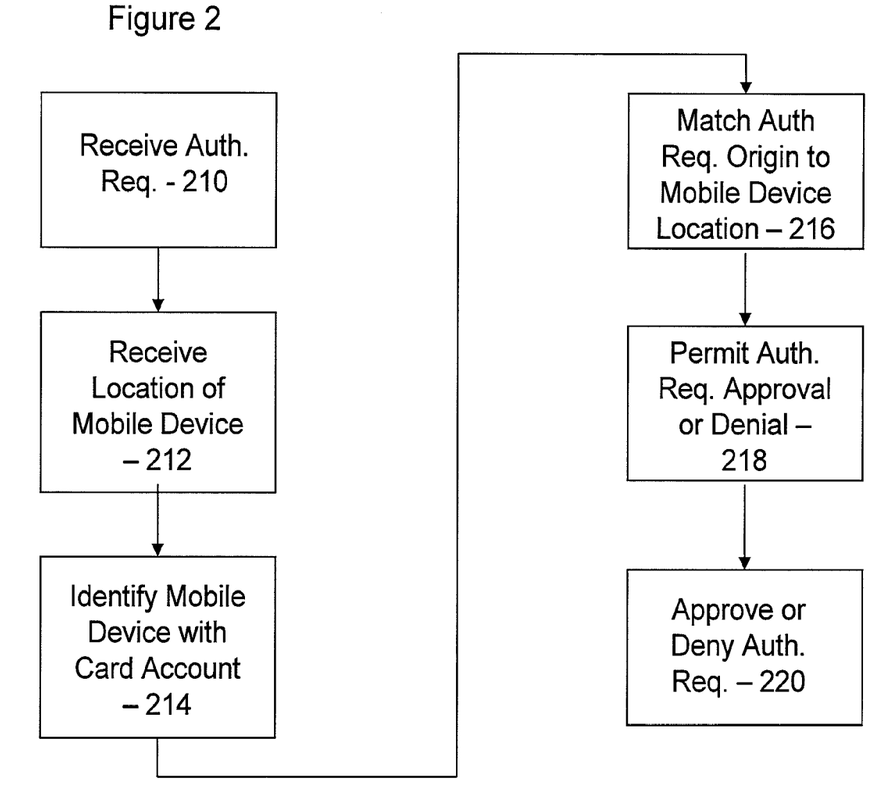
FIG. 2 illustrates a high level flowchart illustrating the process by which an exemplary embodiment of the location controls on payment card transactions may be carried out.

As inferred by the above and illustrated in FIG. 2, the financial transaction method includes receiving (in Step 210), in a managing computer system 110, a request from a merchant 140 (perhaps through the merchant acquirer 130) for authorization of a payment card transaction against the payment card account of a cardholder. The authorization request, as mentioned above, from the merchant 140 includes the geographic origin of the request for authorization (e.g., a merchant transaction terminal for card-present transactions, and a user (e.g. browser) interface of a computer at the user's location for card-not-present transactions).

The financial transaction method also includes receiving in the managing computer system 110 information communicated by the mobile device 160 regarding a current geographic location of the mobile device 160 as determined by the mobile device 160, wherein the mobile device 160 has electronics capable of determining a geographic location of the mobile device 160 (Step 212). Here it should be noted that the mobile device 160 may be set up to periodically report its location to the managing computer system 110. This means that the location information might be received before the managing computer system 110 receives the authorization request, or at the same time or after the managing computer system 110 receives the authorization request, while the authorization request is being processed. As an iteration of the last-mentioned possibility, an alternative or additional feature can be that receipt of an authorization can prompt the managing computer system 110 to inquire of the linked mobile device 160 of its location. The system can be set up to require this location be provided, or not, or other criteria applied to determine when the updated location information is required before the process can proceed (e.g., if the location has not been updated for an extended period, or the pattern of location changes suggests that the mobile device is likely not present at the transaction origination site, such as a transaction occurring at a great distance from the last reported mobile device location. Generally, the last reported location mobile device would be used in many instances.

The financial transaction method further includes identifying, in the managing computer system 110, at least one mobile device 160 associated with the payment card account against which a request for authorization has been received by accessing data stored in the memory device (Step 214). The financial transaction method further includes in Step 216 determining in the managing computer system 110 whether the geographic origin of the authorization request matches the geographic location determined by the mobile device 160. In Step 218, the financial transaction method includes either permitting both the payment card transaction to be processed for authorization when the geographic origin of the authorization request matches the geographic location determined by the mobile device or taking action to permit denying the authorization request for the transaction to be processed for authorization when the geographic origin of the request does not match the geographic location of the mobile device. In Step 220, the payment card authorization request is either approved or denied, and the appropriate message is sent to the merchant 140.

As can be seen above, the location controls on payment card transactions can be implemented in any number of ways as discussed above, or as will occur to those skilled in the art. These embodiments, as well as variations and modifications thereof, which will occur to those skilled in the art, are encompassed by the financial transaction method involving location controls. Hence, the scope of the method and system for implementing the presently disclosed location controls on payment card transaction is limited only by the meets and bounds as articulated in the claims appended hereto.

What is claimed is:

1. A method of processing geographic location data the method comprising the steps of:

storing, in a memory device of a managing computer system, a plurality of cardholder data, wherein each cardholder data, of the plurality of cardholder data, associates identification information of a cardholder mobile terminal with cardholder payment account data, receiving, by the managing computer system, via a payment network, from a point of sale terminal of a plurality of point of sale terminals, an authorization request for processing an electronic transaction pending with a merchant, wherein the authorization request comprises at least (i) an identifier associated with the cardholder payment account and (ii) data representative of the geographic location of the point of sale terminal;

receiving, by the managing computer system, from the cardholder mobile terminal, via a mobile device application installed on the cardholder mobile terminal, cardholder mobile terminal location data representative of the geographical location of the cardholder mobile terminal, wherein (i) the mobile device application enables the cardholder mobile terminal to communicate with the managing computer system, (ii) the cardholder mobile terminal location data is determined by electronics of the cardholder mobile terminal, and (iii) the step of receiving of the cardholder mobile terminal location data is performed prior to the step of receiving the authorization request;

storing, in the memory device of the managing computer system, the cardholder mobile terminal location data, wherein the cardholder mobile terminal location data is associated with the cardholder data;

determining, by the managing computer system a radius of proximity specific to the pending electronic transaction, wherein said radius of proximity is dynamically determined, on a transaction-by-transaction basis, based on a transaction amount of a respective transaction;

obtaining, by the managing computer system, from the authorization request, the data representative of the geographical location of the point of sale terminal;

obtaining, from the memory device, the cardholder mobile terminal location data representative of the geographical location of the cardholder mobile terminal;

comparing, by the managing computer system, the data representative of the geographical location of the point of sale terminal and the cardholder mobile terminal location data;

based on said comparison, determining, by the managing computer system, if the geographical location of the point of sale terminal and the geographical location of the cardholder mobile terminal are (i) within the determined radius of proximity and (ii) within a same local community, wherein the cardholder mobile terminal location data indicates the last known location of the cardholder mobile terminal and in response to a determination indicating that the point of sale terminal and the cardholder mobile terminal are at least one of (i) not located within the radius of proximity to one another and (ii) not located within the same local community, communicating, from the managing computer system, an alert message over the payment network to the cardholder mobile terminal, wherein the alert message flags the electronic transaction as potentially fraudulent.

2. A method according to claim 1, comprising the further steps of:

linking, in the memory device of the managing computer system, a network address of the cardholder mobile terminal with a unique identifier representative of a respective financial account or payment card; and associating, in the memory device of the managing computer system, the associated network address and unique identifier with a financial institution host terminal.

3. A method according to claim 1, wherein the radius of proximity is a geographical area selected from one of (i) an area based on the distance between two geographical points and (ii) an area based on a fixed physical location.

4. A method according to claim 1, wherein the cardholder mobile terminal comprises electronics configured to use a global positioning system to identify the cardholder mobile terminal location data, and the step of receiving cardholder mobile terminal location data from the cardholder mobile terminal comprises the further step of obtaining global positioning coordinates from the cardholder mobile terminal.

5. A method according to claim 1, comprising the further step of forwarding by the managing computer system, the authorization request to a card issuer, for authorizing the transaction, in response to a determination indicating that the point of sale terminal and the cardholder mobile terminal are (i) located within the radius of proximity to one another and (ii) located within the same local community.

6. A managing computer system of an electronic payment system, the managing computer system comprising:

a memory device; and a processor configured to:

store, in the memory device, a plurality of cardholder data, wherein each cardholder data, of the plurality of cardholder data, associates identification information of a cardholder mobile terminal with cardholder payment account data, receive, via a payment network, from a point of sale terminal, from a plurality of point of sale terminals, an authorization request for processing an electronic transaction pending with a merchant, wherein the authorization request comprises at least an identifier associated with the cardholder payment account and (i) data representative of the geographic location of the point of sale terminal;

receive, from the cardholder mobile terminal, via a mobile device application installed on the cardholder mobile terminal, cardholder mobile terminal location data representative of the geographical location of the cardholder mobile terminal, wherein (i) the mobile device application enables the cardholder mobile terminal to communicate with the managing computer system (ii) the cardholder mobile terminal location data is determined by electronics of the cardholder mobile terminal, and (iii) the cardholder mobile terminal location data is received prior to the receipt of the authorization request;

store, in the memory device of the managing computer system, the cardholder mobile terminal location data, wherein the cardholder mobile terminal location data is associated with the cardholder data;

determine a radius of proximity specific to the pending electronic transaction, wherein said radius of proximity is dynamically determined, on a transaction-by-transaction basis, based on a transaction amount of a respective transaction;

obtain, from the authorization request, the data representative of the geographical location of the point of sale terminal;

obtain, from the memory device, the cardholder mobile terminal location data representative of the geographical location of the cardholder mobile terminal;

compare, the data representative of the geographical location of the point of sale terminal and the cardholder mobile terminal location data, wherein the cardholder mobile terminal location data indicates the last known location of the cardholder mobile terminal;

based on said comparison, determine if the geographical location of the point of sale terminal and the geographical location of the cardholder mobile terminal are (i) within the determined radius of proximity and (ii) within a same local community: and in response to a determination indicating that the point of sale terminal and the cardholder mobile terminal are at least one of (i) not located within the determined radius of proximity, and (ii) not located within the same local community, communicate an alert message via the payment network to the cardholder mobile terminal, wherein the alert message flags the electronic transaction as potentially fraudulent.

7. A system according to claim 6, wherein the processor is further configured to implement the following functions:

link a network address of the cardholder mobile terminal with a unique identifier representative of a respective financial account or payment card: and associate the associated network address and unique identifier with a financial institution host terminal.

8. A system according to claim 6, wherein the radius of proximity is a geographical area selected from one of (i) an area based on the distance between two geographical point and (ii) an area based on a fixed physical location.

9. A system according to claim 8, wherein the cardholder mobile terminal location data is received from the cardholder mobile terminal and comprises global positioning coordinates of the cardholder mobile terminal, wherein the global positioning coordinates are determined by the cardholder mobile terminal.

10. A system according to claim 6, wherein the processor is further configured to forward the authorization request to a card issuer for authorize authenticate the transaction in response to a determination indicating that the point of sale terminal and the cardholder mobile terminal are (i) located within the radius of proximity to one another and (ii) located within the same local community.

11. A non-transitory computer-readable medium of a managing computer system upon which program code is stored, which, when processed by a processor of the managing computer system connected to a payment network, causes the processor of the managing computing system to perform the steps of:

storing, in a memory device of the managing computer system, a plurality of cardholder data, wherein each cardholder data, of the plurality of cardholder data, associates identification information of a cardholder mobile terminal with cardholder payment account data, receiving, via the payment network, from a point of sale terminal, of a plurality of point of sale terminal, an authorization request for processing an electronic transaction pending with a merchant, wherein the authorization request comprises at least (i) an identifier associated with the cardholder payment account and (ii) data representative of the geographic location of the point of sale terminal;

receiving, from the cardholder mobile terminal, via a mobile device application installed on the cardholder mobile terminal, cardholder mobile terminal location data representative of the geographical location of the cardholder mobile terminal, wherein (i) the mobile device application enables the cardholder mobile terminal to communicate with the managing computer system, (ii) the cardholder mobile terminal location data is determined by electronics of the cardholder mobile terminal, and (iii) the step of receiving of the cardholder mobile terminal location data is performed prior to the step of receiving the authorization request;

storing, in the memory device of the managing computer system, the cardholder mobile terminal location data, wherein the cardholder mobile terminal location data is associated with the cardholder data;

determining a radius of proximity specific to the pending electronic transaction, wherein said radius of proximity is dynamically determined, on a transaction-by-transaction basis, based on a transaction amount of a respective transaction;

obtaining, from the authorization request, the data representative of the geographical location of a point of sale terminal connected to the payment network and associated with an electronic transaction;

obtaining, from the memory device, data representative of the geographical location of a cardholder mobile terminal associated with the electronic transaction;

comparing the data representative of the geographical location of the point of sale terminal and the cardholder mobile terminal location data, wherein the cardholder mobile terminal location data indicates the last known location of the cardholder mobile terminal;

based on said comparison, determining if the geographical location of the point of sale terminal and the geographical location of the cardholder mobile terminal are (i) within the determined radius of proximity and (ii) within a same local community, wherein the cardholder mobile terminal location data indicates the last known location of the cardholder mobile terminal; and in response to a determination indicating that, the point of sale terminal and the cardholder mobile terminal are at least one of (i) not located within the radius of proximity to one another and (ii) not located within the same local community, communicating, from the managing computer system, an alert message via the payment network to the cardholder mobile terminal, wherein the alert message flags the electronic transaction as potentially fraudulent.

12. The method of claim 1, wherein the step of receiving the cardholder mobile terminal location data occurs at predetermined intervals.

13. The method of claim 1, wherein the cardholder mobile terminal location data is determined based upon the receipt by the cardholder mobile terminal upon detection by the cardholder mobile terminal of entry into an area of service of a new cellular service provider.

14. The method of claim 1, wherein the storing of the cardholder data occurs after a step of receiving, from the cardholder mobile terminal and via the mobile application, registration information, wherein the registration information identifies the cardholder payment account data and the identification information of a cardholder mobile terminal.

15. The method of claim 1, further comprising the steps of:
receiving, by the managing computer system and from the cardholder mobile terminal, via a mobile device application running on the cardholder mobile terminal, control data, wherein the control data defines the radius of proximity to be a same country location; and
storing, in the memory device of the managing computing system, the control data, wherein the control data is associated with the cardholder data.

16. The method of claim 1, wherein the step of receiving of the cardholder mobile terminal location data is performed multiple times, the step of storing the cardholder mobile terminal location data is performed multiple times and the comparing step further comprises comparing the data representative of the geographic location of the point of sale terminal and multiple cardholder mobile terminal location data points.

17. A method of processing geographic location data method comprising the steps of:
obtaining, by a managing computer system, via a payment network, data representative of the geographical location of a point of sale terminal, from a plurality of point of sale terminals;
obtaining data representative of the geographical location of a cardholder mobile terminal, including sending a message over a network to identify the geographical location of the cardholder mobile terminal;
determining by the managing computer system, a radius of proximity specific to the pending electronic transaction, wherein said radius of proximity is dynamically determined. on a transaction-by-transaction basis, based on a transaction amount of a respective transaction;
comparing the geographical location of the point of sale terminal and of the geographical location of the cardholder mobile terminal;
based on said comparison, determining, by the managing computer system, if the geographical location of the point of sale terminal and the geographical location of the cardholder mobile terminal are (i) within the determined radius of proximity and (ii) within a same local community and
in response to a determination indicating that the point of sale terminal and the cardholder mobile terminal are at least one of (i) not located within the radius of proximity to one another and (ii) not located within the same local community, communicating, from the managing computer system, an alert message to the cardholder mobile terminal, wherein the alert message flags the electronic transaction as potentially fraudulent.

18. The method of claim 1, wherein the same local community includes at least one of a town, city, county, country and province.

19. The managing computer system of claim 6, wherein the same local community includes at least one of a town, city, county, country and province.

20. The non-transitory computer readable medium of claim 11, wherein the same local community includes at least one of a town, a city, county, country and province.

21. The method of claim 17, wherein the same local community includes at least one of a town, a city, county, country and province.

* * * * *